United States Patent
Lin et al.

(10) Patent No.: US 6,676,419 B1
(45) Date of Patent: Jan. 13, 2004

(54) PORTABLE STORING DEVICE WITH UNIVERSAL SERIAL BUS

(75) Inventors: Jao-ching Lin, Taoyuan (TW); Chien-cheng Huang, Taoyuan Hsien (TW); Tiem-shun Ma, Tucheng (TW)

(73) Assignee: Asia Vital Components Co., Ltd. (TW)

( * ) Notice: Subject to any disclaimer, the term of this patent is extended or adjusted under 35 U.S.C. 154(b) by 0 days.

(21) Appl. No.: 10/365,490

(22) Filed: Feb. 13, 2003

(51) Int. Cl.[7] .............................................. H01R 12/00
(52) U.S. Cl. ........................ 439/76.1; 439/528; 439/131
(58) Field of Search ................................ 439/76.1, 131, 439/528, 928.1, 906, 945, 687, 696

(56) References Cited

U.S. PATENT DOCUMENTS

| | | | | |
|---|---|---|---|---|
| 5,846,092 A | * | 12/1998 | Feldman et al. ........... 439/76.1 |
| 6,075,709 A | * | 6/2000 | Yang ........................... 361/756 |
| 6,089,908 A | * | 7/2000 | Huang ......................... 439/528 |
| 6,101,372 A | * | 8/2000 | Kubo ........................... 455/558 |
| 6,315,582 B1 | * | 11/2001 | Nishio et al. ............... 439/131 |
| 6,394,817 B1 | * | 5/2002 | Kihira et al. .............. 439/76.1 |
| 6,567,273 B1 | * | 5/2003 | Liu et al. ................... 439/131 |

* cited by examiner

*Primary Examiner*—Tho D. Ta
(74) *Attorney, Agent, or Firm*—Bacon & Thomas, PLLC

(57) ABSTRACT

A portable storing device with universal serial bus (USB) mainly includes an upper cover, a lower cover, a circuit board, and a push-pull control unit. The upper cover is provided with hooks to engage with catches on the lower cover to form a box, in which the circuit board is located. When the push-pull control unit is extended into the upper cover to engage with and move the circuit board forward to project a USB connecting terminal on the circuit board from a front end of the box, a hooking portion on the push-pull control unit engages with a catch below the upper cover to hold the USB connecting terminal to the projected position on the box.

20 Claims, 7 Drawing Sheets

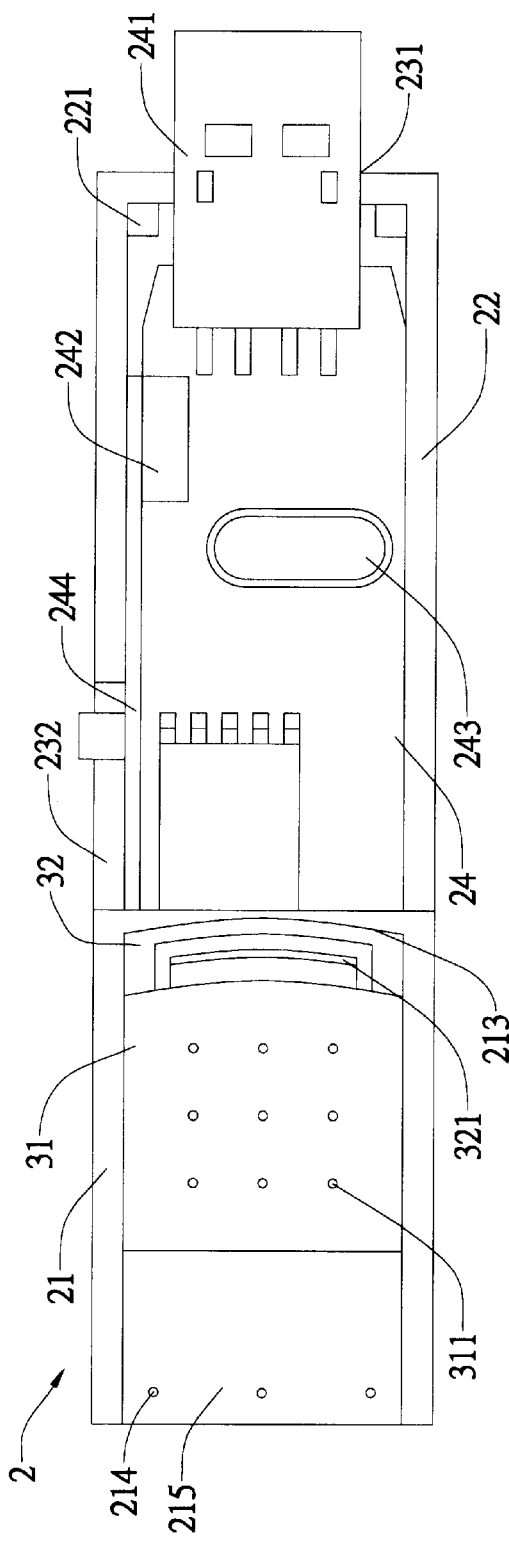
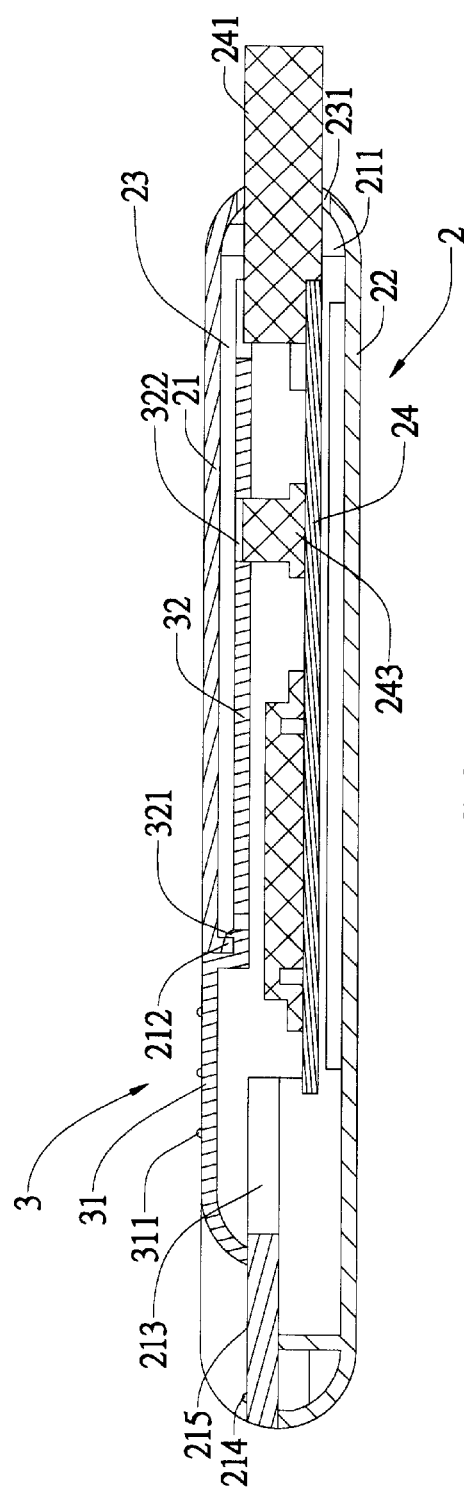
FIG.5
FIG.6

PORTABLE STORING DEVICE WITH UNIVERSAL SERIAL BUS

FIELD OF THE INVENTION

The present invention relates to a portable storing device with universal serial bus (USB). The storing device includes an upper cover provided with hooks and a catch, a lower cover provided with catching portions for engaging the hooks of the upper cover to form a box, a circuit board having a USB connecting terminal provided thereon and being located in the box formed from the upper and lower covers, and a push-pull control unit provided with a hooking portion and adapted to engage with the circuit board.

BACKGROUND OF THE INVENTION

In Taiwanese Patent Application No. 91213459 filed in the name of the same applicant of the present invention, there is disclosed a portable storing device with universal serial bus, exploded and assembled perspective views of which are shown in FIGS. 1 and 2, respectively. As shown, the portable storing device disclosed in Taiwanese Patent Application No. 91213459 includes a case 11 formed from an upper case 11a and a lower case 11b, a circuit board 12 with a USB connecting terminal 121 mounted in the case 11, and a push block 13 having an extension portion 131 extended into the case 11 via a top opening 112 on the upper case 11a. The extension portion 131 is provided with a hole 132 for engaging with an electronic component 122 on the circuit board 12, so that the push block 13 interferes with the circuit board 12. Whereby, when the push block 13 is pushed forward or rearward, the USB connecting terminal 121 on the circuit board 12 is projected from or retracted into the case 11. The above-described portable storing device with USB is therefore very practical for use.

However, it would be even better if the USB connecting terminal, either in the projected or the retracted position, could be stably located in place.

SUMMARY OF THE INVENTION

A primary object of the present invention is to provide a portable storing device with USB, in which means are provided to locate a USB connecting terminal thereof. in place when the same is at an extended position to project from a box of the portable storing device or at a retracted position to locate in the box.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 5 is a partially sectioned top view of the portable storing device of FIG. 3;

FIG. 6 is a sectioned front view of the portable storing device of FIG. 3 showing a USB connecting terminal thereof in a projected position;

DETAILED DESCRIPTION OF THE PREFERRED EMBODIMENTS

Figure 1:
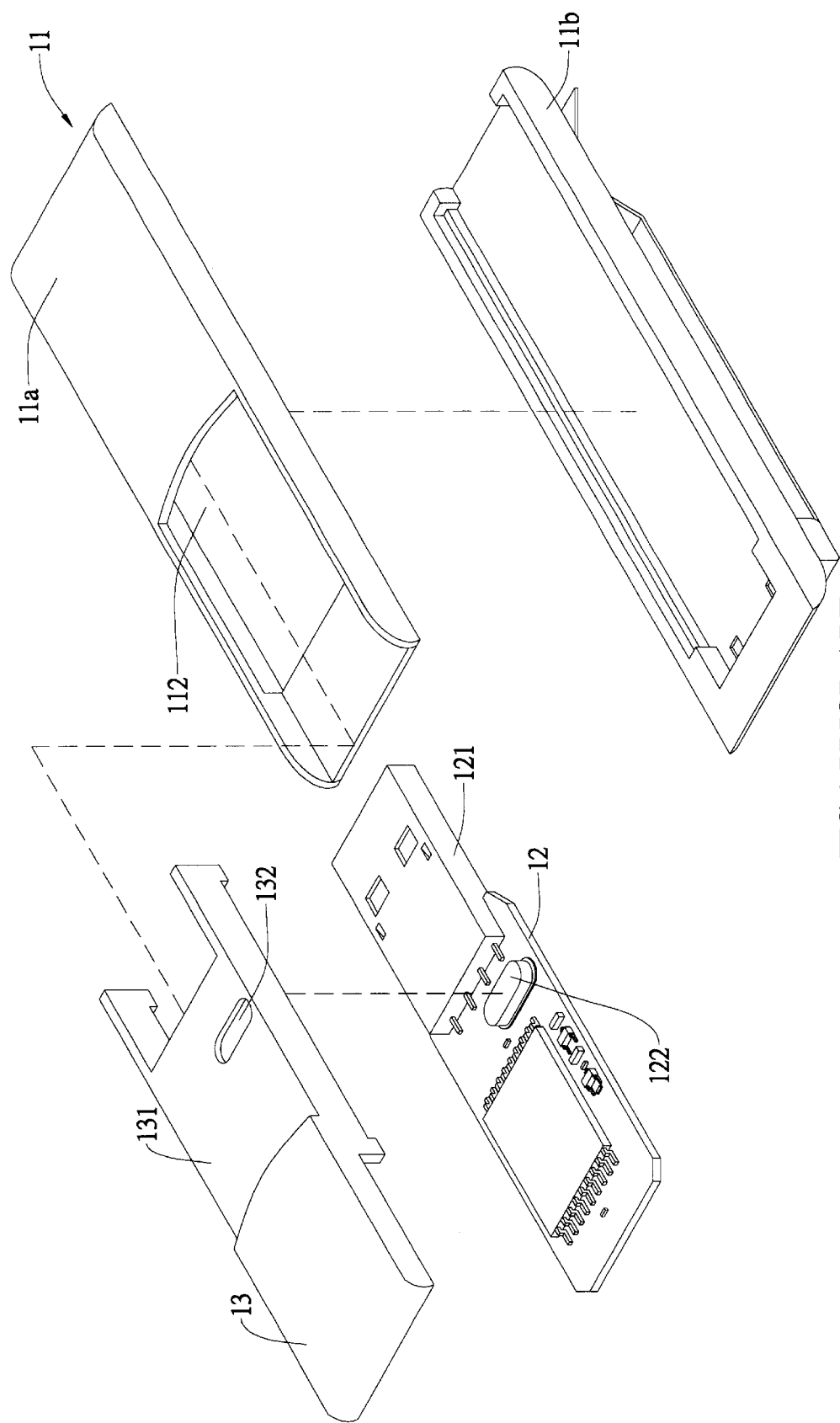
FIG. 1 is an exploded perspective view of a conventional portable storing device with USB.
Figure 2:
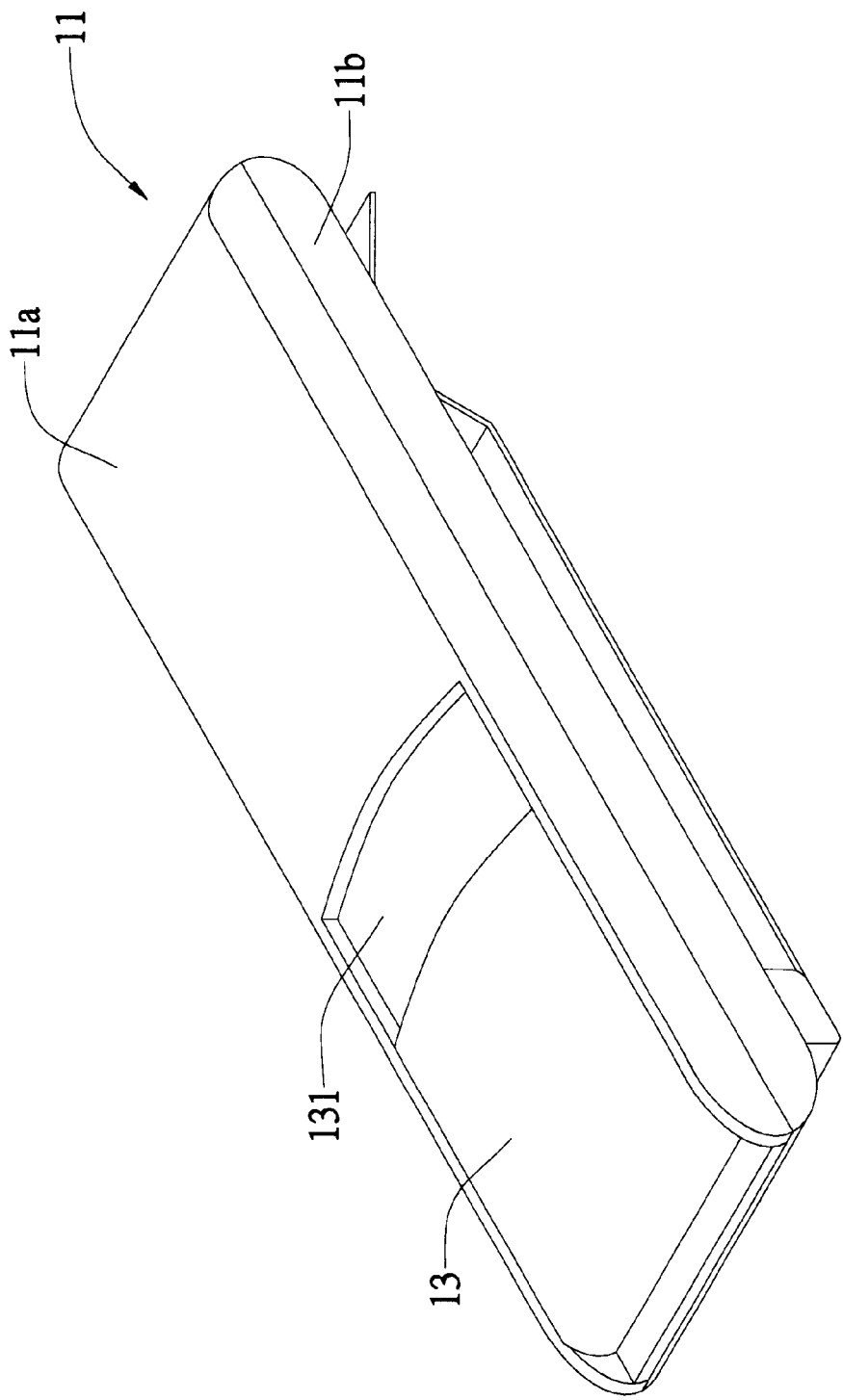
FIG. 2 is an assembled perspective view of FIG. 1.
Figure 3:
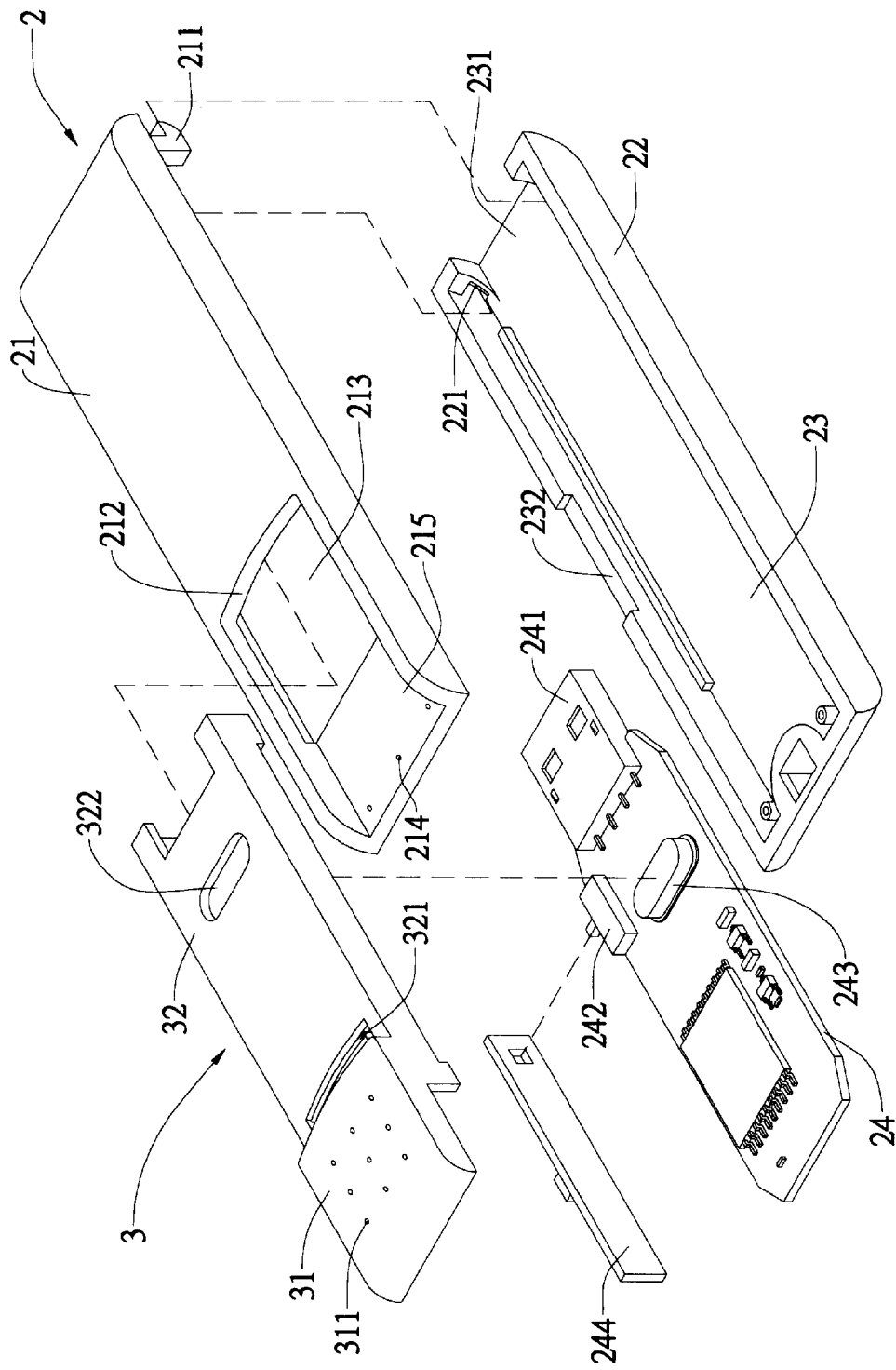
FIG. 3 is an exploded perspective view of a portable storing device with USB according to a first embodiment of the present invention.
Figure 4:
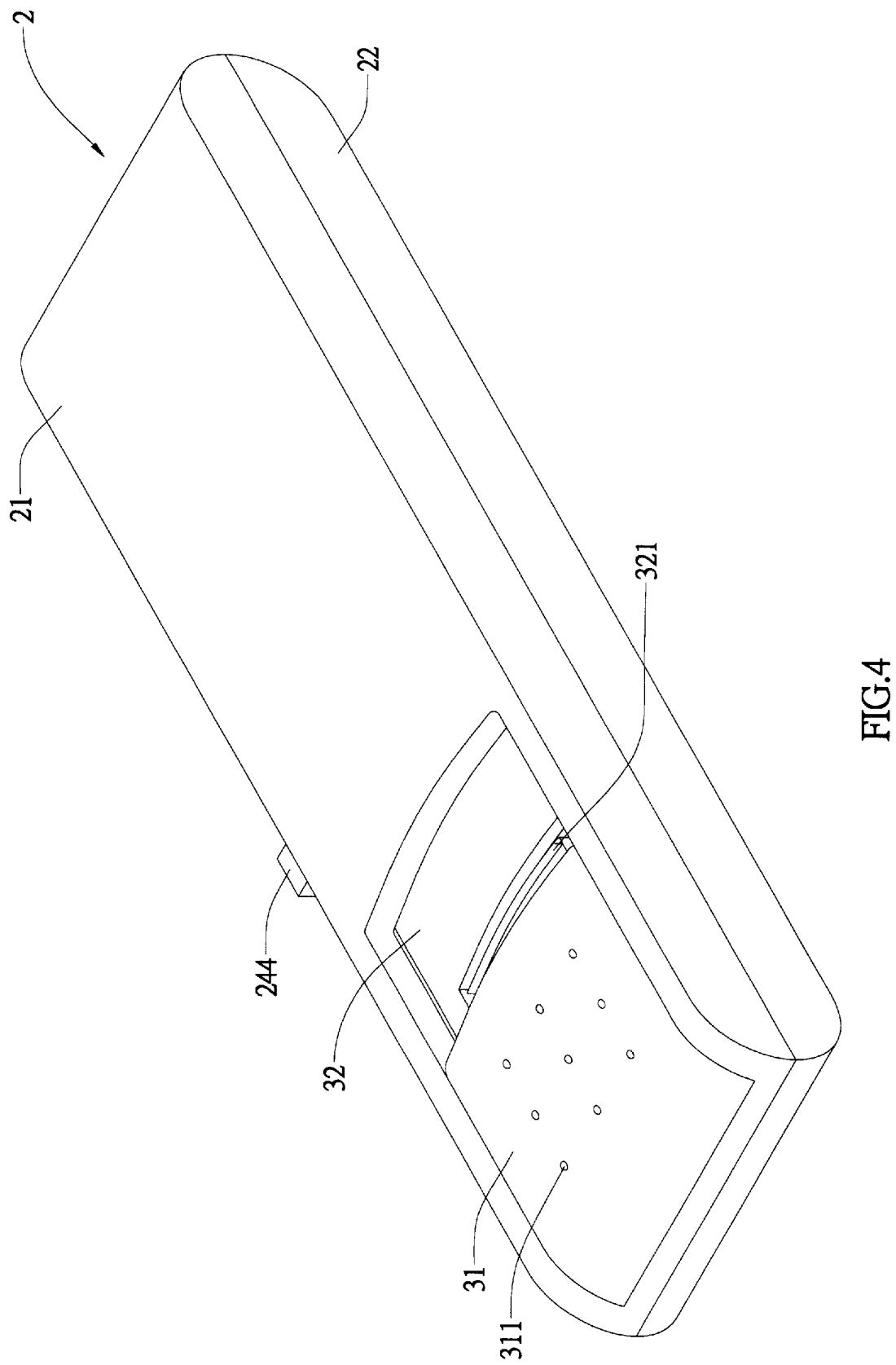
FIG. 4 is an assembled perspective view of FIG. 3.

Please refer to FIGS. 3 and 4 that are exploded and assembled perspective views, respectively, of a portable storing device with USB according to a first embodiment of the present invention. As shown, the portable storing device mainly includes an upper cover 21, a lower cover 22, a circuit board 24, and a push-pull control unit 3.

The upper cover 21 is provided at a lower front end with two fixed hooks 211. A rear top portion of the upper cover 21 is cut out to form a top opening 213. A downward extended catch 212 is provided across a front edge of the top opening 213 (see FIG. 6) and a flat plate 215 is provided across a bottom rear end of the top opening 213. A plurality of protruded dots 214 are formed on an upper surface of the flat plate 215 near a rear edge thereof. The lower cover 22 is provided at an upper front end with two catches 221 corresponding to the hooks 211 on the upper cover 21.

The upper cover 21 and the lower cover 22 are assembled together to form a box 2, which defines a chamber 23 therein. A front opening 231 and a side opening 232 are formed on the box 2 to communicate the chamber 23 with the external environment.

On the circuit board 24, there is provided a USB connecting terminal 241, a limit switch 242, and an upward projection 243.

The limit switch 242 is a write-protect means. A dust cover 244 is connected to an outer side of the limit switch 242 to prevent dust from invading the circuit board 24.

The push-pull control unit 3 includes a push block 31 and an extension block 32 integrally connected to a front of the push block 31. The push block 31 is provided at an upper surface with a plurality of protruded dots 311 to provide an increased friction for a user to push or pull the push-pull control unit 3 at the push block 31 more easily. The extension block 32 is provided at a rear edge immediately in front of the push block 31 with a downward extended hooking portion 321 and near a front edge with a through hole 322. The hooking portion 321 has a curved front edge and a substantially triangular cross section.

To assemble the portable storing device of the present invention, first position the circuit board 24 having the USB connecting terminal 241 in the lower cover 22, and close the upper cover 21 to the lower cover 22 with the hooks 211 at the lower front end of the upper cover 21 engaged with the catches 221 of the lower cover 22 to form the box 2, so that the circuit board 24 is located in the chamber 23. At this point, the dust cover 244 connected to the limit switch 242 is located outside the side opening 232 of the chamber 23. Thereafter, extend the extension block 32 of the push-pull control unit 3 into the top opening 213 of the upper cover 21 to engage the through hole 322 with the projection 243 on the circuit board 24.

Please refer to FIGS. 3 and 5. When the push-pull control unit 3 is pushed forward relative to the box 2 to project the USB connecting terminal 241 from the front opening 231 of the box 2, the curved front edge of the hooking portion 321 below the extension block 32 makes it easy to push the push-pull control unit 3 into the top opening 213 of the upper cover 21.

Please refer to FIG. 6. When the extension block 32 of the push-pull control unit 3 is fully extended into the top opening 213 of the upper cover 21, the triangular cross section of the hooking portion 321 on the extension block 32 makes it easy to engage the hooking portion 321 with the catch 212 below the upper cover 21. Moreover, the engagement of the hooking portion 321 with the catch 212 enables the USB connecting terminal 241 projected from the front opening 231 of the box 2 between the upper and the lower cover 21, 22 to firmly locate at the projected position without the risk of retracting into the chamber 23 of the box 2 due to any external pressure applied thereto.

Figure 7:
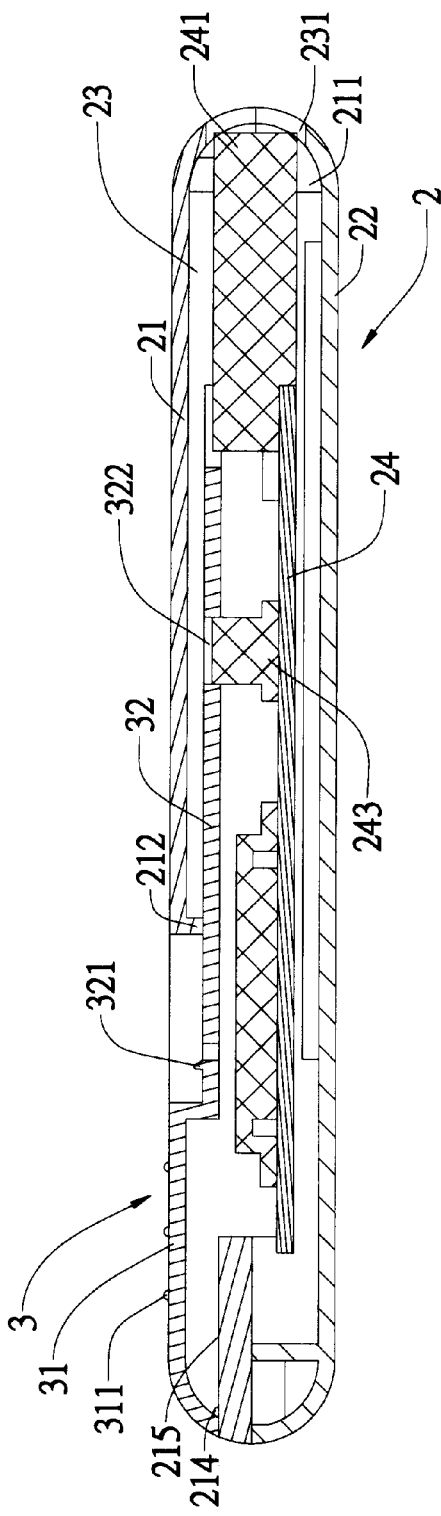
FIG. 7 is a sectioned front view of the portable storing device of FIG. 3 showing the USB connecting terminal thereof in a retracted position.

Please refer to FIG. 7. When the push-pull control unit 3 is rearward pulled to a retracted position relative to the box 2, the push block 31 of the push-pull control unit 3 is interfered by the locating dots 214 provided on the flat plate 215 at the rear end of the upper cover 21 and is held thereto. At this point, the USB connecting terminal 241 is received in the chamber 23 of the box 2 without the risk of moving out of the front opening 231.

Figure 8:
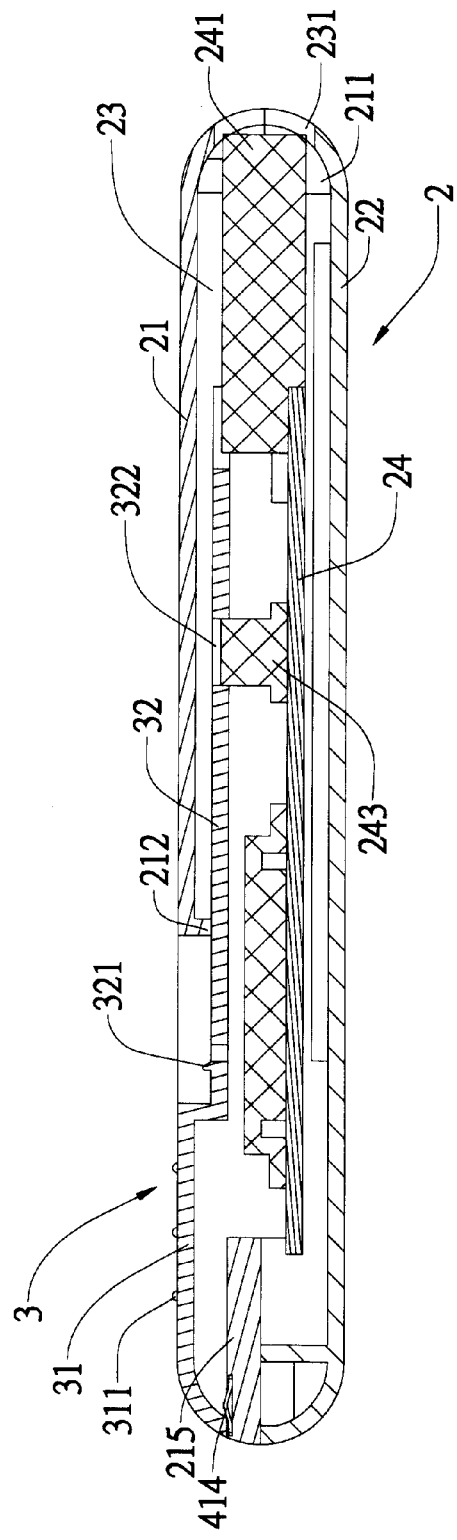
FIG. 8 is a sectioned front view of a portable storing device with USB according to a second embodiment of the present invention.

Please refer to FIG. 8 in which a portable storing device with USB according to a second embodiment of the present invention is shown. This second embodiment also includes a box 2 formed from an upper cover 21 and a lower cover 22, a circuit board 24 having a USB connecting terminal 241 provided at a front end thereof, and a push-pull control unit 3. However, the second embodiment is different from the first one in that the flat plate 215 of the upper cover 21 is provided near a rear edge with a locating leaf spring 414 to substitute for the protruded dots 214. When the push-pull control unit 3 moves the circuit board 24 and accordingly the USB connecting terminal 241 backward into the chamber 23 of the box 2, the push block 31 is interfered by the locating leaf spring 414 to locate the USB terminal 241 at the retracted position in the chamber 23 without the risk of moving out of the front opening 231.

Figure 9:
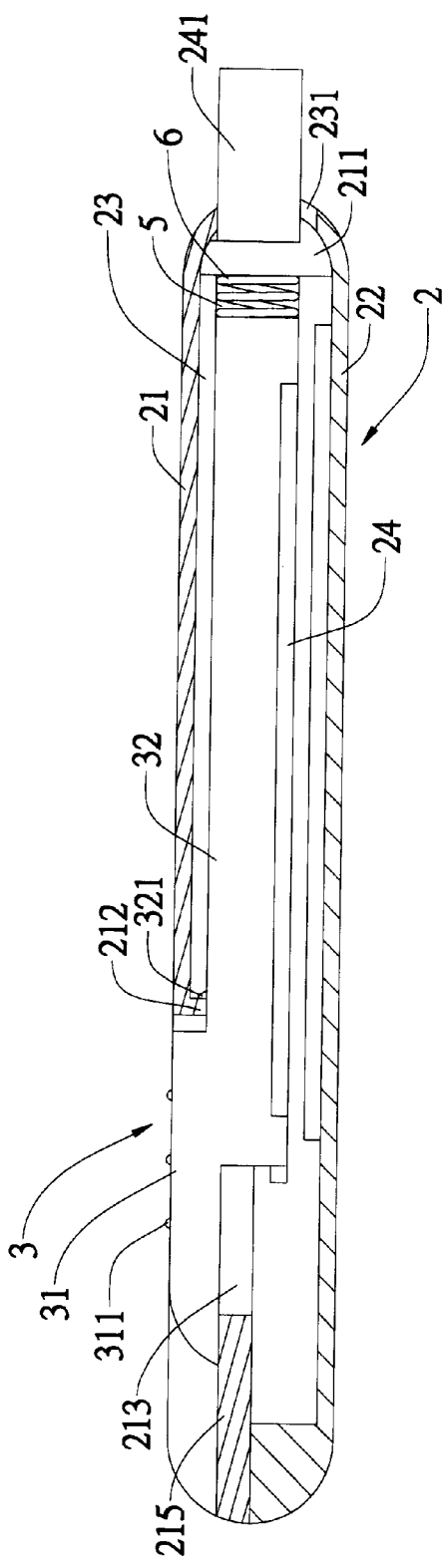
FIG. 9 is a sectioned front view of a portable storing device with USB according to a third embodiment of the present invention, showing a USB connecting terminal thereof in a projected position.
Figure 10:
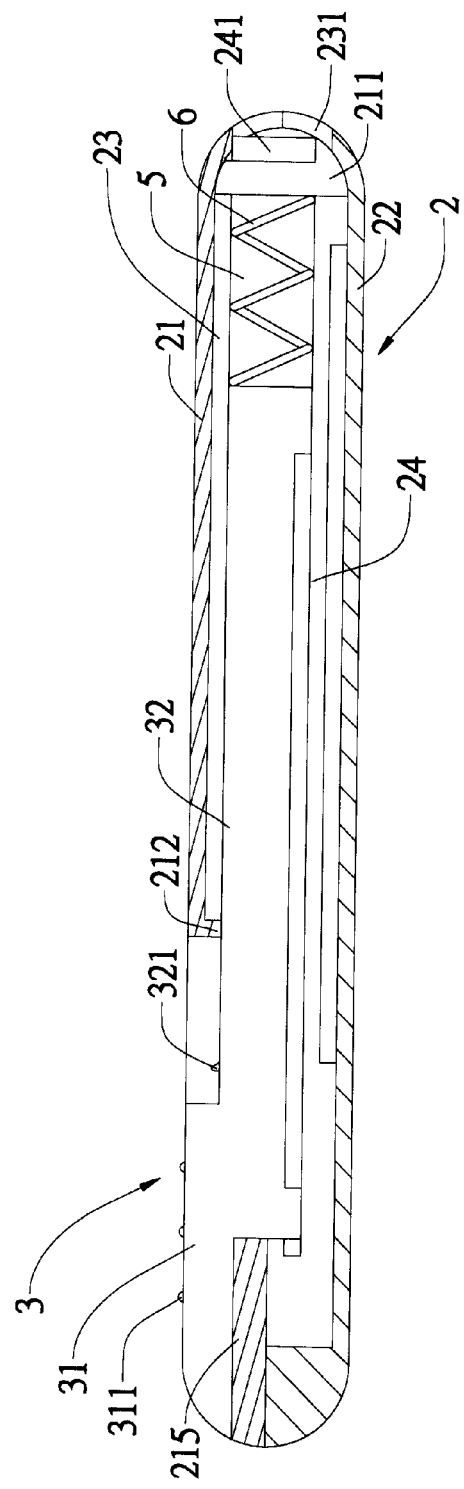
FIG. 10 is a sectioned front view of the portable storing device of FIG. 9 showing the USB connecting terminal thereof in a retracted position.

Please refer to FIGS. 9 and 10 in which a portable storing device with USB according to a third embodiment of the present invention is shown. This third embodiment also includes a box 2 formed from an upper cover 21 and a lower cover 22, a circuit board 24 having a USB connecting terminal 241 provided at a front end thereof, and a push-pull control unit 3. However, the third embodiment is different from the first one in that a room 5 is provided behind the hooks 211 of the upper cover 21 to receive a spring 6 therein. When the extension block 32 of the push-pull control unit 3 is extended into the top opening 213 of the upper cover 21 to engage with the circuit board 24, a front end of the extension block 32 is pressed against the spring 6. When the push-pull control unit 3 moves the USB connecting terminal 241 out of the front opening 231 of the box 2, the spring 6 is subjected to a push force and compressed. And, when the push-pull control unit 3 moves the USB connecting terminal 241 into the chamber 23 of the box 2, a restoring force of the spring 6 pushes the extension block 32 of the push-pull control unit 3 rearward to locate the USB connecting terminal 241 in the chamber 23 at the retracted position.

The hooking portion 321 of the extension block 32 is releasable from the catch 212 of the upper cover 21 when the push block 31 is downwardly pressed to release the hooking portion 321 from the catch 212, as can be readily discerned from FIGS. 6–10.

The present invention has been described with some preferred embodiments thereof and it is understood that many changes and modifications in the described embodiments can be carried out without departing from the scope and the spirit of the invention as defined by the appended claims.

What is claimed is:

1. A portable storing device with USB, comprising:

an upper cover having hooks provided at a lower front end and a downward extended catch provided at a predetermined position on an underside thereof;

a lower cover being provided at a front end with catches adapted to engage with said hooks on said upper cover;

a circuit board being positioned in a box formed from said upper and said lower cover closed to each other, said circuit board having a USB connecting terminal connected to a front end thereof;

a push-pull control unit being provided at a predetermined position with a hooking portion adapted to releasably engage with said catch below said upper cover;

said upper and said lower covers being closed to each other through engagement of said hooks of said upper cover with said catches on said lower cover; and wherein said circuit board is provided with a limit switch that can be switched to provide a write-protect function.

2. The portable storing device with USB as claimed in claim 1, wherein said limit switch has a dust cover connected to an outer side thereof to prevent dust from invading said circuit board.

3. A portable storing device with USB, comprising:

an upper cover having hooks provided at a lower front end and a downward extended catch provided at a predetermined position on an underside thereof;

a lower cover being provided at a front end with catches adapted to engage with said hooks on said upper cover;

a circuit board being positioned in a box formed from said upper and said lower cover closed to each other, said circuit board having a USB connecting terminal connected to a front end thereof;

a push-pull control unit being provided at a predetermined position with a hooking portion adapted to releasably engage with said catch below said upper cover;

said upper and said lower covers being closed to each other through engagement of said hooks of said upper cover with said catches on said lower cover; and wherein said upper cover is provided at a predetermined position with a locating means that engages with said push-pull control unit when said USB connecting terminal is moved rearward by said push-pull control unit to a retracted position in said box formed from said upper and lower covers, such that said USB connecting terminal does not automatically move out of said box from said retracted position.

4. The portable storing device with USB as claimed in claim 3, wherein said locating means comprises a plurality of protruded dots.

5. The portable storing device with USB as claimed in claim 3, wherein said locating means comprises a locating leaf spring.

6. The portable storing device with USB as claimed in claim 3, wherein said locating means comprises a spring.

7. A portable storing device with USB, comprising:

an upper cover having hooks provided at a lower front end and a downward extended catch provided at a predetermined position on an underside thereof;

a lower cover being provided at a front end with catches adapted to engage with said hooks on said upper cover;

a circuit board being positioned in a box formed from said upper and said lower cover closed to each other, said circuit board having a USB connecting terminal connected to a front end thereof;

a push-pull control unit being provided at a predetermined position with a hooking portion adapted to releasably engage with said catch below said upper cover;

said upper and said lower covers being closed to each other through engagement of said hooks of said upper cover with said catches on said lower cover; and wherein said upper cover is provided at a rear top portion with a top opening, via which said push-pull control unit is extended into said box to engage with said circuit board.

8. A portable storing device with USB, comprising:

an upper cover having a downward extended catch provided at a predetermined position on an underside thereof;

a lower cover being assembled to said upper cover to form a box;

a circuit board being positioned in said box formed from said upper and said lower cover, and said circuit board having a USB connecting terminal connected to a front end thereof;

a push-pull control unit being provided at a predetermined position with a hooking portion adapted to releasably engage with said catch below said upper cover; and whereby when said push-pull control unit is pushed forward to protect said USB connecting terminal from a front end of said box formed from said upper and lower covers with said hooking portion on said push-pull control unit engaged with said catch below said upper cover, said USB connecting terminal is held to the projected position without the risk of automatically retracting into said box.

9. The portable storing device with USB as claimed in claim 8, wherein said upper cover is provided at a rear top portion with a top opening, via which said push-pull control unit is extended into said box to engage with said circuit board.

10. The portable storing device with USB as claimed in claim 8, wherein said hooking portion on said push-pull control unit has a curved front edge to enable an easy engagement of said hooking portion with said catch below said upper cover.

11. The portable storing device with USB as claimed in claim 8, wherein said hooking portion of said push-pull control unit has a triangular cross section to enable an easy engagement of said hooking portion with said catch below said upper cover.

12. The portable device with USB as claimed in claim 8, wherein said push-pull control unit is provided at a predetermined position with a plurality of protruded dots, said dots providing an increased friction between said push-pull control unit and a user's hand pushing said push-pull control unit to enable an easy movement of said push-pull control unit.

13. The portable storing device with USB as claimed in claim 8, wherein said circuit board is provided with a limit switch that can be switched to provide a write-protect function.

14. The portable storing device with USB as claimed in claim 13, wherein said limit switch has a dust cover connected to an outer side thereof to prevent dust from invading said circuit board.

15. The portable storing device with USB as claimed in claim 8, wherein said upper cover is provided at a predetermined position with a locating means that engages with said push-pull control unit when said USB connecting terminal is moved rearward by said push-pull control unit to a retracted position in said box formed from said upper and lower covers, such that said USB connecting terminal does not automatically move out of said box from the retracted position.

16. The portable storing device with USB as claimed in claim 15, wherein said locating means comprises a plurality of protruded dots.

17. The portable storing device with USB as claimed in claim 15, wherein said locating means comprises a locating leaf spring.

18. The portable storing device with USB as claimed in claim 15, wherein said locating means comprises a spring.

19. The portable storing device with USB as claimed in claim 8, wherein said upper cover is provided at predetermined positions with hooks for conveniently hooking said upper cover to said lower cover to form said box.

20. The portable storing device with USB as claimed in claim 19, wherein said lower cover is provided at predetermined positions with catches for engaging with said hooks on said upper cover.

* * * * *